US012738703B2

(12) United States Patent
Takata et al.

(10) Patent No.: US 12,738,703 B2
(45) Date of Patent: Sep. 15, 2026

(54) ROTARY CONNECTOR

(71) Applicant: EAGLE INDUSTRY CO., LTD., Tokyo (JP)

(72) Inventors: Hiroshi Takata, Tokyo (JP); Hiroshi Sawada, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 327 days.

(21) Appl. No.: 18/294,060

(22) PCT Filed: Jul. 22, 2022

(86) PCT No.: PCT/JP2022/028426

§ 371 (c)(1),
(2) Date: Jan. 31, 2024

(87) PCT Pub. No.: WO2023/021923

PCT Pub. Date: Feb. 23, 2023

(65) Prior Publication Data

US 2024/0339795 A1 Oct. 10, 2024

(30) Foreign Application Priority Data

Aug. 19, 2021 (JP) ................................ 2021-134093

(51) Int. Cl.
*H01R 39/64* (2006.01)

(52) U.S. Cl.
CPC ................................ *H01R 39/643* (2013.01)

(58) Field of Classification Search
CPC .................................................. H01R 39/643
USPC ........................................................ 439/17
See application file for complete search history.

(56) References Cited

U.S. PATENT DOCUMENTS 5,829,986 A * 11/1998 Kong .................. H01R 39/643 439/19
5,923,114 A * 7/1999 Senni .................. H01R 39/643 439/19

(Continued)

FOREIGN PATENT DOCUMENTS

CN 111416253 A 7/2020
JP S5115165 5/1976 .............. F16C 33/76

(Continued)

OTHER PUBLICATIONS

International Search Report and Written Opinion issued in PCT/JP2022/028426, dated Sep. 20, 2022, with English translation, 12 pages.

(Continued)

*Primary Examiner* — Harshad C Patel
(74) *Attorney, Agent, or Firm* — HAYES SOLOWAY P.C.

(57) ABSTRACT

The rotary connector includes: an outer peripheral electrode; an inner peripheral electrode which is inserted through the outer peripheral electrode and is disposed to be rotatable; a plurality of roller current collectors which are arranged to make a planetary motion between the outer peripheral electrode and the inner peripheral electrode; a bearing that axially supports the inner peripheral electrode to be rotatable; and a bearing holder that holds the bearing, wherein bent portions are provided at a passage extending from a contact portion between the inner peripheral electrode and the roller current collector to the bearing.

18 Claims, 8 Drawing Sheets

(56) References Cited

U.S. PATENT DOCUMENTS

| | | | | |
|---|---|---|---|---|
| 6,612,847 | B2 * | 9/2003 | Canizales, Jr. | H01R 39/643 439/19 |
| 7,802,992 | B2 * | 9/2010 | Niitsu | H01R 39/643 439/19 |
| 7,811,091 | B2 * | 10/2010 | Koyama | H01R 39/643 439/19 |
| 10,431,948 | B2 * | 10/2019 | Ashimura | H01R 3/08 |

FOREIGN PATENT DOCUMENTS

| | | | | |
|---|---|---|---|---|
| JP | S5115165 | B1 | 5/1976 | |
| JP | S5310040 | | 1/1978 | F16C 33/76 |
| JP | S60172725 | | 9/1985 | F16C 33/80 |
| JP | H9210071 | | 8/1997 | F16C 33/80 |
| JP | 2011222463 | | 11/2011 | H01R 39/28 |
| JP | 2012169155 | | 9/2012 | H01R 39/28 |
| JP | 2012169155 | A | 9/2012 | |
| JP | 2013-152914 | A2 | 8/2013 | |
| JP | 2015207461 | A | 11/2015 | |
| JP | 201737828 | | 2/2017 | H01R 39/00 |
| JP | 2021-170521 | A2 | 10/2021 | |

OTHER PUBLICATIONS

International Preliminary Report on Patentability issued in PCT/JP2022/028426, dated Feb. 29, 2024, 5 pages.

Notification of Reason for Refusal issued in Taiwan Patent Appln. Serial No. 111128790, dated Oct. 31, 2023, with English translation, 9 pages.

* cited by examiner

ROTARY CONNECTOR

TECHNICAL FIELD

The present invention relates to a rotary connector, for example, a rotary connector used for electrically connecting a rotary element and a stationary element in a rotating mechanism.

BACKGROUND ART

In various industrial fields, a rotary connector for electrically connecting a rotary element and a stationary element in a rotating mechanism can electrically connect an inner peripheral electrode and an outer peripheral electrode via a current collecting element disposed between the conductive inner peripheral electrode connected to the rotary element and the conductive outer peripheral electrode electrically connected to the stationary element.

In such a rotary connector, those filled with liquid metal such as mercury and gallium alloys and those in which a plurality of conductive roller current collectors are arranged are known as the current collecting element. In recent years, the rotary connector to which the roller current collector is applied has been gaining attention from the viewpoint of the environmental load caused by liquid leakage, the risk of electric leakage, and the like.

For example, in a rotary connector illustrated in Patent Citation 1, an inner peripheral electrode is inserted through a cylindrical outer peripheral electrode and cylindrical roller current collectors are evenly arranged between the outer peripheral electrode and the inner peripheral electrode. Further, a bearing holder holding a bearing is fixed to both axial ends of the outer peripheral electrode. The inner peripheral electrode is axially supported by these bearings to be rotatable. Accordingly, when a rotary element in a rotating mechanism rotates, the inner peripheral electrode rotates by following the rotation of the rotary element. Then, each roller current collector in contact with the outer peripheral surface of the inner peripheral electrode also rolls relatively to the inner peripheral electrode. At this time, since each roller current collector is also in contact with the inner peripheral surface of the outer peripheral electrode, the roller current collector rolls relative to the outer peripheral electrode. That is, each roller current collector can electrically connect the inner peripheral electrode and the outer peripheral electrode while making a planetary motion in which the roller current collector revolves around the inner peripheral electrode while rotating on its own axis.

CITATION LIST

Patent Literature

Patent Citation 1: JP 2011-222463 A (Page 6, FIG. 2)

SUMMARY OF INVENTION

Technical Problem

In the rotary connector of Patent Citation 1, since the roller current collector is elastically deformable and the outer diameter of the roller current collector is slightly larger than the radial dimension between the outer peripheral surface of the inner peripheral electrode and the inner peripheral surface of the outer peripheral electrode, the outer peripheral surface of the roller current collector is in surface contact with each of the outer peripheral surface of the inner peripheral electrode and the inner peripheral surface of the outer peripheral electrode, whereby the energization efficiency is improved.

Incidentally, since the circumferential dimension of the inner peripheral surface in the outer peripheral electrode located on the outer radial side is longer than the circumferential dimension of the outer peripheral surface in the inner peripheral electrode located on the inner radial side, the roller current collector easily slides on the outer peripheral electrode while following along the outer peripheral surface of the inner peripheral electrode.

As described above, since the roller current collector is elastically deformed and easily slides on the outer peripheral electrode in use, contaminants such as wear powder and peeling powder are likely to be generated at the contact points with the inner peripheral electrode, the outer peripheral electrode, and the roller current collector. Contaminants are particularly likely to be generated when the contact points are plated. Accordingly, in the roller current collector of Patent Citation 1 of which the axial direction is disposed along the up and down direction (vertical direction), contaminants are likely to enter the lower bearing and disturb the smooth rotation of the inner peripheral electrode. As a result, the life of the rotary connector may be shortened.

The present invention has been made in view of such problems and an object thereof is to provide a rotary connector capable of stably functioning over a long period of time.

Solution to Problem

In order to solve the foregoing problems, a rotary connector according to the present invention is a rotary connector including: an outer peripheral electrode; an inner peripheral electrode which is inserted through the outer peripheral electrode and is disposed to be rotatable; a plurality of roller current collectors which are arranged to make a planetary motion between the outer peripheral electrode and the inner peripheral electrode; a bearing that axially supports the inner peripheral electrode to be rotatable; and a bearing holder that holds the bearing, wherein a bent portion is provided at a passage extending from a contact portion between the inner peripheral electrode and the roller current collector to the bearing. According to the aforesaid features of the present invention, contaminants are suppressed from entering the bearing from the roller current collector due to the trapping at the bent portion. Accordingly, the bearing is less likely to be caught by contaminants. Therefore, the rotary connector can stably function over a long period of time.

It may be preferable that the rotary connector is placed vertically and the bent portion is provided at a vertically lower side of the roller current collector. According to this preferable configuration, since contaminants descending due to gravity are trapped by the bent portion, it is possible to prevent contaminants from moving linearly toward the bearing.

It may be preferable that the bearing is a shielded bearing in which a shield element is provided at least vertically upward. According to this preferable configuration, the shielded bearing is less likely to be caught by contaminants slipping through the passage. Therefore, the rotary connector can stably function over a longer period of time.

It may be preferable that the bent portion is formed by a protrusion extending in a radial direction. According to this preferable configuration, since contaminants are trapped by the protrusion extending in the radial direction, it is possible to prevent contaminants from moving linearly toward the bearing.

It may be preferable that the protrusion includes an inner radial protrusion and an outer radial protrusion, and the inner radial protrusion and the outer radial protrusion overlap each other in a vertical direction. According to this preferable configuration, since the inner radial protrusion and the outer radial protrusion overlap each other in the vertical direction to form the plurality of bent portions so that the passage extends in a zigzag shape, contaminants are less likely to reach the bearing. Preferably, since a part of the zigzag passage has a length orthogonal to the extension direction equal to or shorter than half of the radial dimension of the bearing, contaminants are less likely to reach the bearing.

It may be preferable that the bent portion includes a recess which opens vertically upward. According to this preferable configuration, the recess provided in the bent portion is highly capable of holding trapped contaminants.

It may be preferable that the recess has an annular shape. According to this preferable configuration, the annular recess is highly efficient in trapping contaminants.

It may be preferable that the recess is formed in the bearing holder. According to this preferable configuration, since the bearing holder is a stationary component that does not rotate, no rotational force is applied to contaminants trapped in the recess. Therefore, the recess can reliably hold contaminants.

It may be preferable that the rotary connector further includes a protrusion portion which extends toward the recess. According to this preferable configuration, the protrusion portion not only prevents contaminants from moving linearly toward the bearing, but also tends to guide contaminants into the recess.

It may be preferable that the protrusion portion partially enters the recess. According to this preferable configuration, the protrusion portion can form a labyrinth structure together with the recess. Accordingly, the protrusion portion and the recess can more effectively prevent contaminants from moving toward the bearing.

DESCRIPTION OF EMBODIMENTS

Modes for carrying out a rotary connector according to the present invention will be described based on embodiments.

First Embodiment

A rotary connector according to a first embodiment of the present invention will be described with reference to FIGS. 1 to 3. Hereinafter, the upper and lower sides when viewed from the front in FIG. 1 will be described as the upper and lower sides of the rotary connector. Specifically, the upper side of the paper where the socket is disposed is the upper side of the rotary connector, and the lower side of the paper where the cover is disposed is the lower side of the rotary connector.

A rotary connector 1 according to the first embodiment is placed vertically and is used at a rotating position of a semiconductor manufacturing machine which is a rotating mechanism. The rotary connector 1 conducts high-frequency electricity supplied from an external power source as a stationary element in the semiconductor manufacturing machine to a rotating shaft as a rotary element in the semiconductor manufacturing machine.

Figure 1:
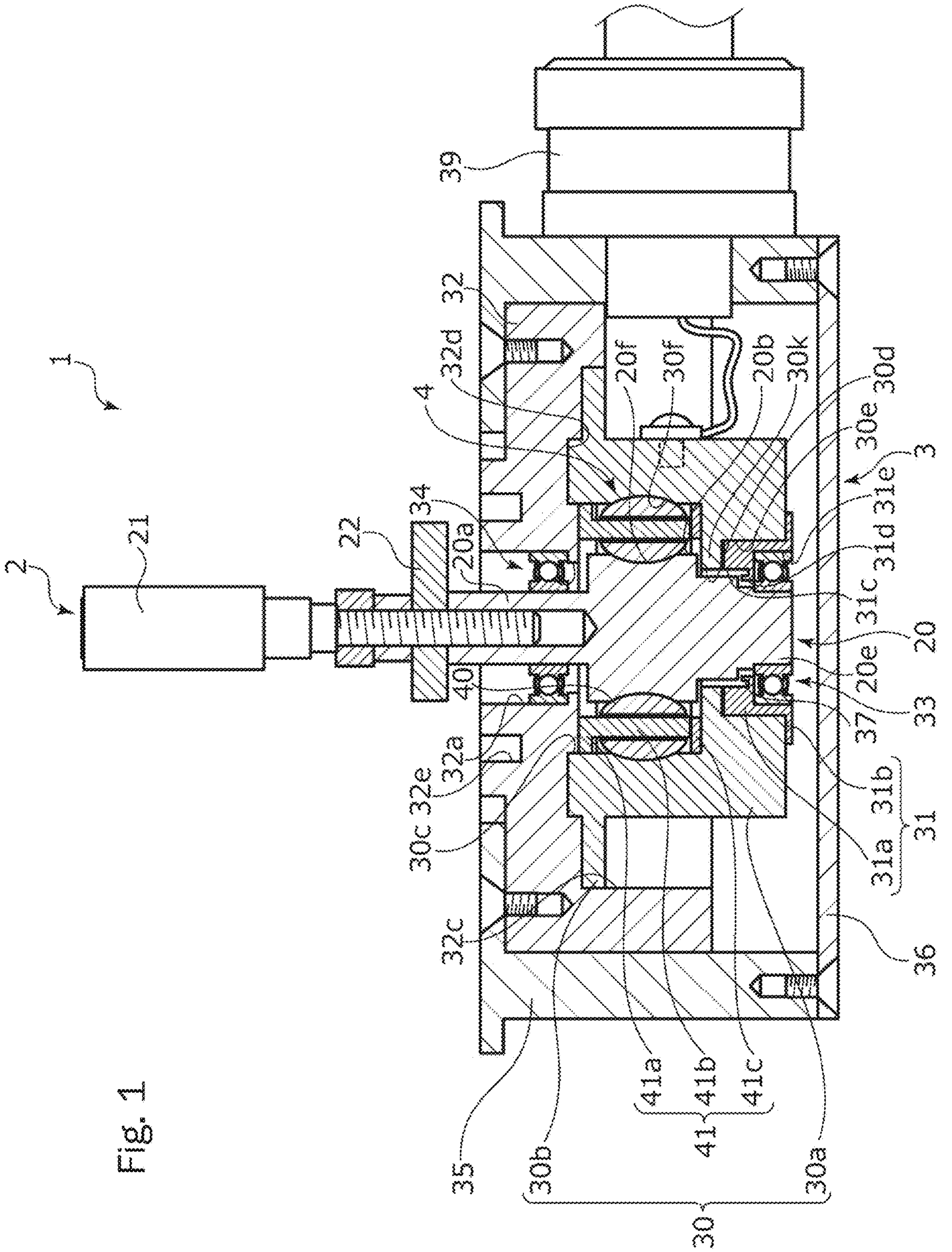
FIG. 1 is a cross-sectional view of a rotary connector according to first embodiment of the present invention.
Figure 2:
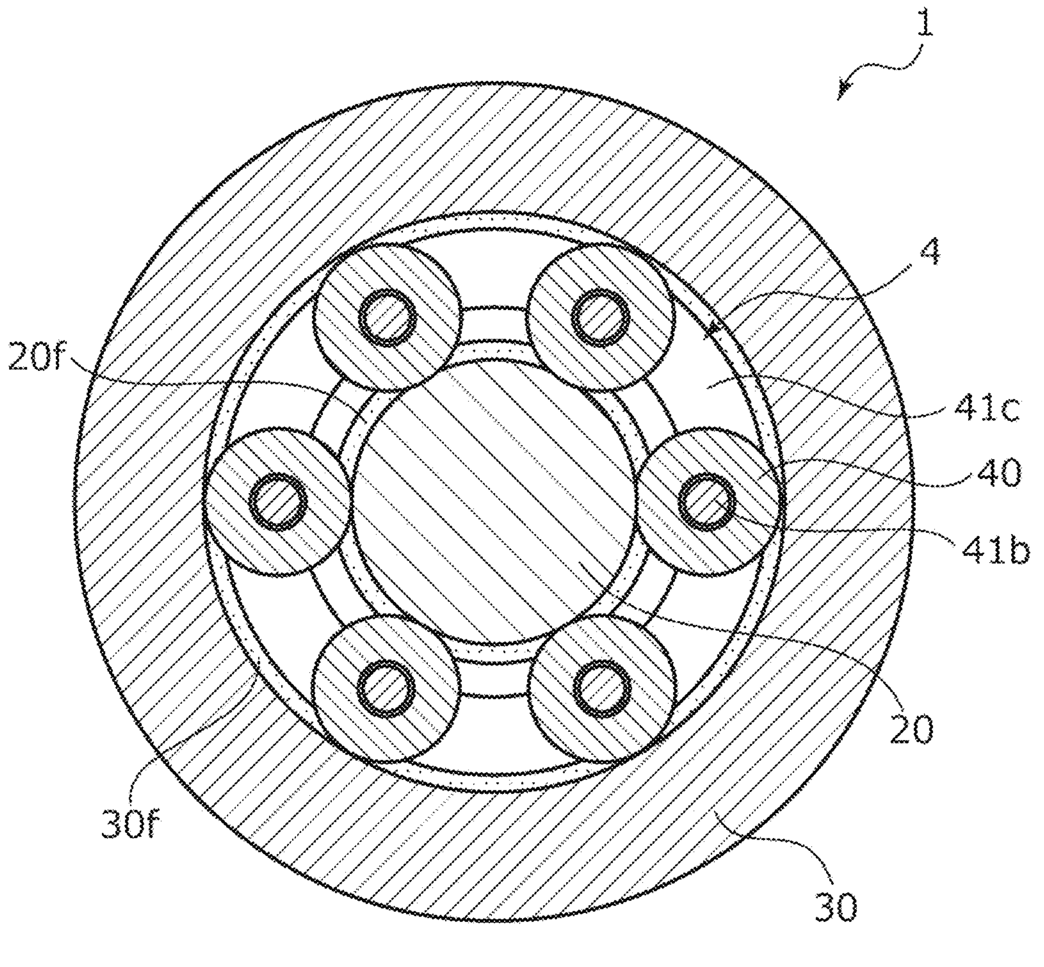
FIG. 2 is an axial cross-sectional view of the rotary connector according to the first embodiment.

As illustrated in FIG. 1, the rotary connector 1 mainly includes a rotary element 2, a stationary element 3, and a current collecting element 4. The rotary element 2 which is connected to a rotating shaft in the semiconductor manufacturing machine is provided to be rotatable relative to the stationary element 3 by following the rotating shaft. As the rotary element 2 rotates, a roller current collector 40 in the current collecting element 4 makes a planetary motion around the rotary element 2 while electrically contacting the rotary element 2 and the stationary element 3. Further, the stationary element 3 includes a connector 39 connectable to an external power source.

First, the rotary element 2 will be described. The rotary element 2 includes an inner peripheral electrode 20, a socket 21, and a key 22.

The inner peripheral electrode 20 is formed of metal or the like and has electrical conductivity. As illustrated in FIGS. 1 and 3, the inner peripheral electrode 20 includes an upper shaft **20*a*, a large-diameter cylinder 20*b*, an intermediate-diameter cylinder 20*c* (see FIG. 3), a small-diameter cylinder 20*d* (see FIG. 3), and a lower shaft 20*e*** in order from the axially upper side. These are arranged so that their axes are aligned in the same straight line.

The socket 21 is fixed onto the upper shaft **20*a* by screwing. Further, the key 22 is externally fitted and fixed to the outer peripheral surface of the upper shaft 20*a***.

The large-diameter cylinder **20*b* is formed to have a diameter larger than that of the upper shaft 20*a*. Further, an annular groove 20*f* which decreases in diameter toward the axial center is formed on the outer peripheral surface of the large-diameter cylinder 20*b*. Further, the outer peripheral surface of the large-diameter cylinder 20*b*** is plated with a highly conductive material such as silver.

Since the plating is thin and the drawing is complicated, the illustration is omitted. The same applies to plating described below.

The intermediate-diameter cylinder **20*c* (see FIG. 3) is formed to have a diameter smaller than that of the large-diameter cylinder 20*b*. The small-diameter cylinder 20*d* (see FIG. 3) is formed to have a diameter smaller than that of the intermediate-diameter cylinder 20*c*. The lower shaft 20*e* is formed to have substantially the same diameter as that of the upper shaft 20*a*. Specifically, the lower shaft is formed to have substantially the same diameter as that of the portion in which a bearing 34** is fitted.

The socket 21 is formed of a highly conductive material. The socket 21 is connected to the rotating shaft of the semiconductor manufacturing machine in a non-rotating state. In this state, the rotating shaft is also prevented from rotating by being key-coupled to the key 22.

Next, the stationary element 3 will be described. The stationary element 3 mainly includes an outer peripheral electrode 30, a lower bearing holder 31, an upper bearing holder 32, two bearings 33 and 34, a housing 35, and a cover 36. For convenience of description, the bearings 33 and 34 are the stationary element 3.

The outer peripheral electrode 30 is formed of a highly conductive material to have a flange attached cylindrical shape. The outer peripheral electrode 30 includes a tubular portion 30*a*, an outer flange portion 30*b*, and an inner flange portion 30*k* serving as a protrusion and an inner radial protrusion.

The tubular portion 30*a* is formed in a stepped cylindrical shape in which the lower side extends radially inward. A large-diameter hole portion 30*c*, a small-diameter hole portion 30*d*, and an intermediate-diameter hole portion 30*e* are formed on the inner radial side of the outer peripheral electrode 30 in order from the axially upper side.

An annular groove 30*f* which increases in diameter toward the axial center is formed at the axial center of the large-diameter hole portion 30*c*. The annular groove 30*f* is disposed to face the annular groove 20*f* of the inner peripheral electrode 20. Further, the inner peripheral surface of the large-diameter hole portion 30*c* is plated with highly conductive material such as silver.

The small-diameter hole portion 30*d* is an inner radial portion of the inner flange portion 30*k*, communicates with the large-diameter hole portion 30*c*, and has a diameter smaller than that of the large-diameter hole portion 30*c*. The intermediate-diameter hole portion 30*e* communicates with the small-diameter hole portion 30*d* and has a diameter smaller than that of the large-diameter hole portion 30*c* and larger than that of the small-diameter hole portion 30*d*.

The outer flange portion 30*b* is formed in an annular flat plate shape extending radially outward below the upper edge of the tubular portion 30*a*. The inner flange portion 30*k* is formed in an annular flat plate shape extending radially inward slightly below the tubular portion 30*a* in the axial direction.

The lower bearing holder 31 is formed of a resin molded product or the like, has high insulating properties, and is formed in a flange attached cylindrical shape. The lower bearing holder 31 includes a tubular portion 31*a*, an outer flange portion 31*b*, and an annular protrusion 37 serving as a protrusion and an inner radial protrusion in order from the axially upper side.

The tubular portion 31*a* is formed in a stepped cylindrical shape in which the upper side extends radially inward. An intermediate-diameter hole portion 31*c*, a small-diameter hole portion 31*d*, and a large-diameter hole portion 31*e* are formed on the inner radial side of the lower bearing holder 31 in order from the axially upper side.

The intermediate-diameter hole portion 31*c* is opened axially upward. The small-diameter hole portion 31*d* is an inner radial portion of the annular protrusion 37, communicates with the intermediate-diameter hole portion 31*c*, and has a diameter smaller than that of the intermediate-diameter hole portion 31*c*. The large-diameter hole portion 31*e* communicates with the small-diameter hole portion 31*d*, is opened downward, and has a diameter larger than that of the intermediate-diameter hole portion 31*c*.

The outer flange portion 31*b* is formed in an annular flat plate shape substantially orthogonal to the lower end of the tubular portion 31*a* and extending radially outward.

Figure 3:
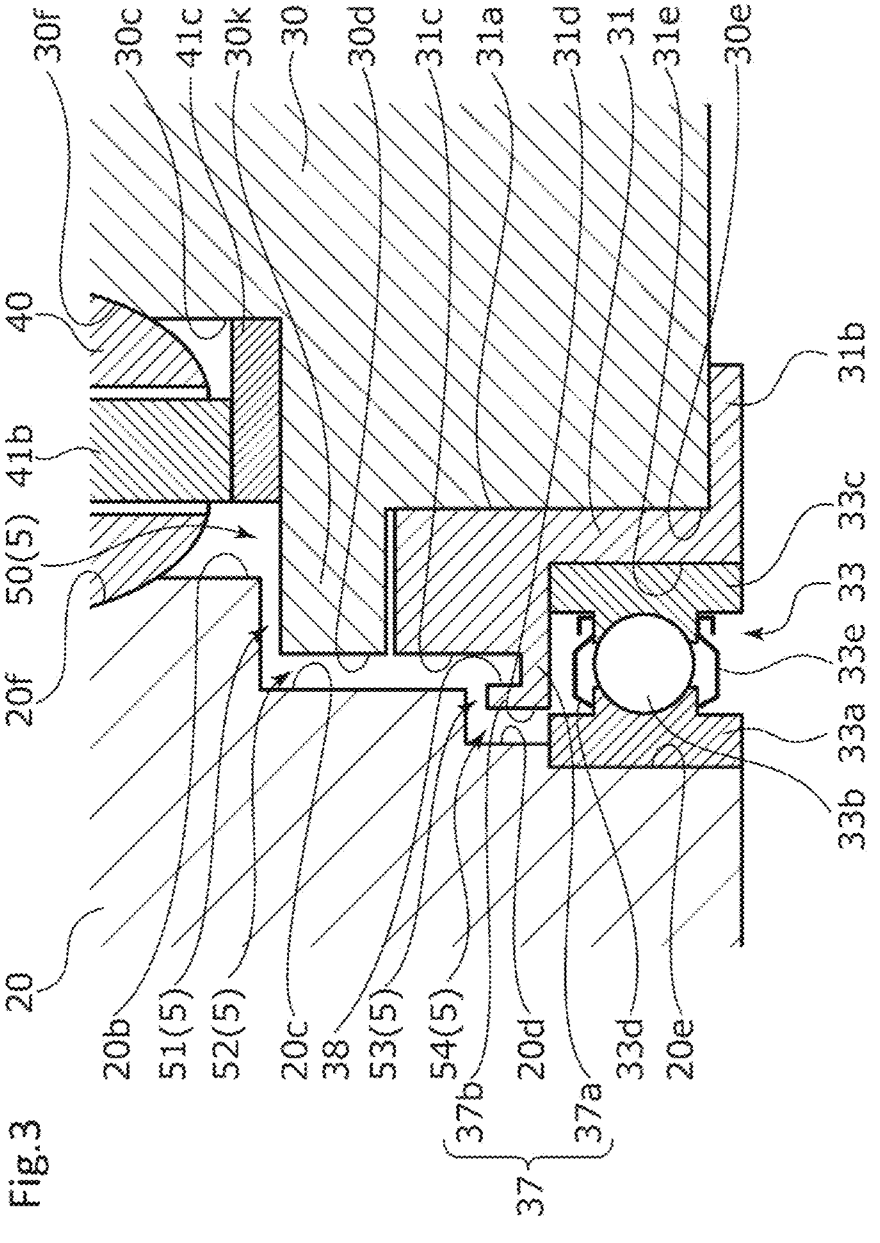
FIG. 3 is a main enlarged view of the rotary connector according to the first embodiment.

As illustrated in FIG. 3, the annular protrusion 37 includes a bottom portion 37*a* and an inner radial tubular portion 37*b*. The annular protrusion 37 is provided with an annular recess 38 serving as an annular recess opened axially upward, that is, the vertically upper side.

The bottom portion 37*a* is formed in an annular flat plate shape substantially orthogonal to the inner peripheral surface of the intermediate-diameter hole portion 31*c* and extending radially inward. The inner radial tubular portion 37*b* is formed in a cylindrical shape substantially orthogonal to the inner radial end of the bottom portion 37*a* and extending axially upward.

The bearing 33 is fitted into the large-diameter hole portion 31*e*. As will be described later, an outer race 33*c* of the bearing 33 comes into contact with the upper end surface of the large-diameter hole portion 31*e*.

The tubular portion 31*a* of the lower bearing holder 31 is fitted and fixed in the intermediate-diameter hole portion 30*e* of the outer peripheral electrode 30. Further, the outer flange portion 31*b* of the lower bearing holder 31 comes into contact with the lower edge of the outer peripheral electrode 30 to restrict the position. Accordingly, the outer race 33*c* of the bearing 33 is positioned.

The upper bearing holder 32 is formed of a resin molded product or the like, has high insulating properties, and is formed in a stepped cylindrical shape in which the upper side extends radially inward.

The bearing 34 is fitted in the intermediate-diameter hole portion 32*a* of the upper bearing holder 32. Additionally, since the bearings 33 and 34 have the same shape, these bearings will be described as the bearing 33 unless otherwise specified in the following description and the description of the bearing 34 will be omitted.

The outer peripheral electrode 30 is fitted in the large-diameter hole portion 32*c* in the upper bearing holder 32. Further, the upper end of the tubular portion 30*a* in the outer peripheral electrode 30 is fitted into the annular concave portion 32*d* in the upper bearing holder 32. With these, the outer peripheral electrode 30 is positioned radially and axially with respect to the upper bearing holder 32.

Further, the upper end portion of the upper bearing holder 32 is provided with an annular groove 32*e* which is opened axially upward and is recessed axially downward. The creepage distance of the upper bearing holder 32 is increased by the groove 32*e*.

As illustrated in FIG. 3, the bearing 33 is a shielded bearing which includes an inner race 33*a*, a plurality of balls 33*b*, the outer race 33*c*, and lip seals 33*d* and 33*e* serving as shield elements. That is, the bearing 33 is a shielded bearing in which the lip seals 33*d* and 33*e* are provided at the vertically upper side and the vertically lower side as the shield elements.

The lip seals 33*d* and 33*e* are formed in an annular shape, one end thereof is fixed to the inner race 33*a*, and the lip portion slides on the outer race 33*c*. Accordingly, contaminants are less likely to enter the rolling positions of the inner race 33*a*, the ball 33*b*, and the outer race 33*c*.

The lower shaft 20*e* in the inner peripheral electrode 20 is fitted in the bearing 33, more specifically, its inner race 33*a*. Further, the upper end of the inner race 33*a* comes into contact with the lower end surface in the small-diameter cylinder 20*d*.

The upper shaft 20*a* in the inner peripheral electrode 20 is inserted into the bearing 34.

The inner peripheral electrode 20 is axially supported to the stationary element 3 to be rotatable by these bearings 33 and 34.

Returning to FIG. 1, the housing 35 has insulating properties and is formed in a stepped cylindrical shape. Further, the cover 36 has insulating properties and is formed in a thin plate shape.

The upper bearing holder 32 is fitted in the housing 35. The outer peripheral electrode 30 and the upper bearing holder 32 are integrally assembled by screwing a bolt inserted into a communication hole of the housing 35 into a female thread at the upper end of the upper bearing holder 32.

Further, the cover 36 is fixed to the lower end of the tubular portion in the housing 35 with bolts.

The connector 39 is fixed to the side wall of the housing 35. The outer peripheral electrode 30 and the connector 39 are electrically connected by electric wires. Power can be supplied from an external power source (not illustrated) to the connector 39.

Next, the current collecting element 4 will be described. As illustrated in FIGS. 1 and 2, the current collecting element 4 includes six roller current collectors 40 (see FIG. 2) and a current collector holder 41. Additionally, in FIG. 2, the annular grooves 20*f* and 30*f* are hatched.

The roller current collector 40 is formed of metal or the like, has high conductivity, is elastically deformable, and is formed in a barrel-like tubular shape which increases in diameter from both axial ends toward the axial center. Further, the outer peripheral surface thereof is plated with a highly conductive material such as silver.

The current collector holder 41 includes an upper plate member 41*a*, six pins 41*b*, and a lower plate member 41*c*. The upper plate member 41*a* and the lower plate member 41*c* are formed in an annular thin plate shape.

The pin 41*b* has high conductivity and is elastically deformable. Six pins 41*b* are equally distributed (see FIG. 2), and their upper ends are fixed to the upper plate member 41*a*.

The current collecting element 4 is assembled such that six roller current collectors 40 are arranged on the annular groove 20*f* in the inner peripheral electrode 20, six pins 41*b* are inserted through the corresponding roller current collectors 40 from the axially upper side, and the lower end of the pin 41*b* is press-fitted into the communication hole of the corresponding lower plate member 41*c*.

Further, when the inner peripheral electrode 20 is inserted into the inner radial side of the outer peripheral electrode 30, the current collecting element 4 is press-fitted into the annular groove 30*f* of the outer peripheral electrode 30 while the current collector holder 41 and the pin 41*b* are elastically deformed. In addition, the assembling method can be changed as appropriate. For example, an introduction groove extending in the axial direction and aligned to each roller current collector 40 may be formed on the outer peripheral electrode 30 and the roller current collector 40 may be inserted along the introduction groove so that the roller current collector 40 is inserted into the annular groove 30*f*.

Further, in the gap between the annular groove 20*f* in the inner peripheral electrode 20 and the annular groove 30*f* in the outer peripheral electrode 30, the radial dimension at each position in the axial direction is slightly shorter than the radial dimension at the same position of the roller current collector 40.

Accordingly, the roller current collector 40 which is elastically deformed by being pressed between the annular groove 20*f* in the inner peripheral electrode 20 and the annular groove 30*f* in the outer peripheral electrode 30 is in surface contact with the annular groove 20*f* in the inner peripheral electrode 20 and the annular groove 30*f* in the outer peripheral electrode 30 without being in line contact therewith. As a result, the inner peripheral electrode 20, the roller current collector 40, and the outer peripheral electrode 30 are reliably brought into electrical contact in use.

As illustrated in FIG. 3, a passage 5 which communicates from the roller current collector 40 to the lower bearing 33 is formed between the rotary element 2 and the stationary element 3.

The passage 5 includes an upper axial portion 50, an upper radial portion 51, an intermediate axial portion 52, a lower radial portion 53, and a lower axial portion 54 in order from the roller current collector 40. Further, the passage 5 is provided with a plurality of bent portions in such a manner that the upper axial portion 50 and the upper radial portion 51, the upper radial portion 51 and the intermediate axial portion 52, the intermediate axial portion 52 and the lower radial portion 53, and the lower radial portion 53 and the lower axial portion 54 are substantially orthogonal to each other. That is, the passage 5 is formed in a zigzag shape by a plurality of bent portions.

Specifically, the upper axial portion 50 is mainly defined by the outer peripheral surface of the large-diameter cylinder 20*b* in the inner peripheral electrode 20 and the inner peripheral surface of the lower plate member 41*c* in the current collector holder 41 disposed substantially in parallel to the outer peripheral surface to be separated therefrom in the radial direction. Accordingly, the upper axial portion 50 is opened toward the roller current collector 40 located at the axially upper side and extends axially downward.

The upper radial portion 51 is defined by the lower end surface of the large-diameter cylinder 20*b* in the inner peripheral electrode 20 and the upper end surface of the inner flange portion 30*k* in the outer peripheral electrode 30 disposed substantially in parallel to the lower end surface to be separated therefrom in the axial direction. Accordingly, the upper radial portion 51 communicates with the lower end of the upper axial portion 50 and extends radially inward to be substantially orthogonal to the lower end.

That is, the bent portion of the passage 5 formed by the upper axial portion 50 and the upper radial portion 51 orthogonal to each other is formed by the inner flange portion 30*k* serving as a protrusion extending radially inward from the tubular portion 30*a* in the outer peripheral electrode 30.

The intermediate axial portion 52 is mainly defined by the outer peripheral surface of the intermediate-diameter cylinder 20*c* in the inner peripheral electrode 20, the inner peripheral surface of the small-diameter hole portion 30*d* in the outer peripheral electrode 30 disposed substantially in parallel to the outer peripheral surface to be separated therefrom in the radial direction, and the inner peripheral surface of the intermediate-diameter hole portion 31*c* in the lower bearing holder 31. The inner peripheral surface of the small-diameter hole portion 30*d* and the inner peripheral surface of the intermediate-diameter hole portion 31*c* are arranged in the same straight line. Accordingly, the intermediate axial portion 52 communicates with the inner radial end of the upper radial portion 51 and extends axially downward to be substantially orthogonal to the inner radial end.

Further, the intermediate axial portion 52 communicates with the annular recess 38 disposed in the extension direction thereof.

The lower radial portion 53 is defined by the lower end surface of the intermediate-diameter cylinder 20*c* in the inner peripheral electrode 20 and the upper end surface of the inner radial tubular portion 37*b* in the annular protrusion 37 disposed substantially in parallel to the lower end surface to be separated therefrom in the axial direction. Accordingly, the upper radial portion 51 communicates with the lower end of the intermediate axial portion 52 and extends radially inward to be substantially orthogonal to the lower end.

That is, the bent portion of the passage 5 formed by the intermediate axial portion 52 and the lower radial portion 53 orthogonal to each other is formed by the annular protrusion 37 serving as a protrusion extending radially inward from the tubular portion 31*a* in the lower bearing holder 31.

The lower axial portion 54 is mainly defined by the outer peripheral surface of the small-diameter cylinder 20*d* in the inner peripheral electrode 20 and the inner peripheral surface of the inner radial tubular portion 37*b* in the annular protrusion 37 disposed substantially in parallel to the outer peripheral surface to be separated therefrom in the radial direction. Accordingly, the lower axial portion 54 communicates with the inner radial end of the lower radial portion 53, extends axially downward to be substantially orthogonal to the inner radial end, and is opened toward the bearing 33 located at the axially lower side.

In the rotary connector 1 of this embodiment having the above-described configuration, the inner peripheral electrode 20 rotates relative to the outer peripheral electrode 30 by following the rotating shaft in the semiconductor manufacturing machine.

Further, in this rotation, each roller current collector 40 revolves around the inner peripheral electrode 20 together with the current collector holder 41 while rolling relative to the outer peripheral surface of the large-diameter cylinder 20*b* in the inner peripheral electrode 20.

At this time, each roller current collector 40 also rolls relative to the inner peripheral surface of the large-diameter hole portion 30*c* in the outer peripheral electrode 30.

Accordingly, each roller current collector 40 ensures a conductive area while the inner peripheral electrode 20 rotates relative to the outer peripheral electrode 30. Therefore, the rotary connector 1 can conduct the electricity supplied from the external power source to the rotating shaft in the semiconductor manufacturing machine.

Further, each roller current collector 40 has a barrel shape. Then, the annular grooves 20*f* and 30*f* are formed along the outer peripheral surface of the roller current collector 40. With these, even when the roller current collector 40 tries to move axially upward, the movement is restricted by the peripheral surfaces defining the annular grooves 20*f* and 30*f*.

Further, when the inner peripheral electrode 20 tries to tilt relative to the axis of the outer peripheral electrode 30, the roller current collector 40 easily follows the peripheral surfaces defining the annular grooves 20*f* and 30*f*.

Therefore, in the rotary connector 1, the contact area between the roller current collector 40 and the peripheral surfaces defining the annular grooves 20*f* and 30*f* is less likely to change. Accordingly, in the rotary connector 1, it is easy to keep the amount of electricity supplied from the external power source and conducted to the rotating shaft of the semiconductor manufacturing machine substantially constant.

Further, each roller current collector 40 is rotatably supported by the highly conductive pin 41*b*. Accordingly, since the allowable current value of the pin 41*b* is added to the allowable current value of the roller current collector 40, the maximum amount of electricity that can be conducted increases.

Further, the roller current collectors 40 held by the current collector holder 41 are restricted from being relatively close to each other in the circumferential direction. That is, the current collector holder 41 prevents damage due to contact between the roller current collectors 40.

Further, the bearing 33 is metallic and electrically conductive and the bearing holders 31 and 32 have insulating properties. Therefore, the bearing holders 31 and 32 can prevent the leakage of electricity conducted from the inner peripheral electrode 20 to the bearing 33.

Further, the rotary connector 1 is cased by the housing 35 and the cover 36 having high insulating properties. Therefore, the rotary connector 1 is prevented from unintentional leakage, electric shock due to contact, and the like.

When each roller current collector 40 makes a planetary motion, contaminants such as wear powder and plating peeling powder are generated due to friction, deterioration over time, etc. Contaminants may descend due to gravity and enter the passage 5.

As described above, the passage 5 is formed in a zigzag shape by a plurality of bent portions in such a manner that the upper axial portion 50 and the upper radial portion 51, the upper radial portion 51 and the intermediate axial portion 52, the intermediate axial portion 52 and the lower radial portion 53, and the lower radial portion 53 and the lower axial portion 54 are substantially orthogonal to each other.

More specifically, the bent portion formed by the upper axial portion 50 and the upper radial portion 51 substantially orthogonal to each other is provided at the vertically lower side of the roller current collector 40 and prevents contaminants from descending due to gravity and moving vertically downward in a straight line. Further, the bent portion formed by the intermediate axial portion 52 and the lower radial portion 53 substantially orthogonal to each other is also provided at the vertically lower side of the roller current collector 40 and prevents contaminants from descending due to gravity and moving vertically downward in a straight line. Here, in the specification, the vertically lower side of the roller current collector 40 is not limited to just below as long as it is below. Accordingly, contaminants are less likely to reach the bearing 33 compared to a configuration in which the passage is formed in a straight-line shape. In this way, since the passage 5 is formed in a zigzag shape by the plurality of bent portions, the movement of contaminants is suppressed.

Further, since the passage 5 is narrow, contaminants are less likely to move toward the bearing 33. From the viewpoint of preventing movement, the extent of the narrowness may be set such that the length orthogonal to the extension direction of the passage 5 (that is, the direction in which contaminants move toward the bearing 33) is equal to or shorter than half of the radial dimension of the bearing and preferably equal to or shorter than the diameter of the ball 33*b*. Further, in this embodiment, all of the upper axial portion 50, the upper radial portion 51, the intermediate axial portion 52, the lower radial portion 53, and the lower axial portion 54 constituting the passage 5 are narrow, but a part of them may be narrow.

Further, contaminants descending while being guided to the upper axial portion 50 fall onto the inner flange portion 30*k* in the outer peripheral electrode 30. That is, since contaminants are dropped and trapped on the upper end surface of the inner flange portion 30*k* extending radially inward at the bent portion formed by the upper axial portion 50 and the upper radial portion 51 substantially orthogonal to each other, it is possible to restrict the movement of contaminants in the passage 5.

Further, contaminants passing through the upper radial portion 51 and descending while being guided to the intermediate axial portion 52 fall onto the annular recess 38 formed in the annular protrusion 37 in the lower bearing holder 31. That is, since contaminants are dropped and trapped on the annular recess 38 formed at the annular protrusion 37 extending radially inward at the bent portion formed by the intermediate axial portion 52 and the lower radial portion 53 substantially orthogonal to each other, it is possible to restrict the movement of contaminants in the passage 5. Further, since the annular protrusion 37 is disposed above the bearing 33 like an eave, contaminants are prevented from moving linearly toward the bearing 33. Additionally, the annular protrusion 37 may not be provided with the annular recess 38. In this case, contaminants are dropped and trapped on the flat upper end surface of the annular protrusion 37 extending radially inward at the bent portion.

As described above, contaminants are prevented from entering the bearing 33 from the roller current collector 40 by being trapped by the bent portions formed in the passage 5. Accordingly, the bearing 33 is less likely to be caught by contaminants. Therefore, the rotary connector 1 can stably function over a long period of time.

Further, since the rotary connector 1 of this embodiment is placed vertically and the bent portion is provided at the vertically lower side of the roller current collector 40, contaminants descending due to gravity are trapped by the bent portion and hence are prevented from moving linearly toward the bearing.

Further, since the bent portion formed in the passage 5 is formed by the inner flange portion 30*k* and the annular protrusion 37 extending radially inward, contaminants can be prevented from moving linearly toward the bearing 33. Further, since the passage 5 extends in a zigzag shape as the passage 5 is formed by a plurality of bent portions, contaminants are less likely to reach the bearing 33.

Further, the annular recess 38 formed in the annular protrusion 37 is formed in a groove shape opening axially upward at the bent portion formed in the passage 5. Therefore, the annular recess 38 is highly capable of holding trapped contaminants.

Further, the annular recess 38 which is formed in an annular shape can trap contaminants falling at any position in the circumferential direction. Therefore, the annular recess 38 is highly efficient in trapping contaminants.

Further, the rotational force of the inner peripheral electrode 20 is not applied to the annular recess 38 formed in the lower bearing holder 31 which is a stationary member. Accordingly, the rotational force of the inner peripheral electrode 20 is not applied to contaminants trapped by the annular recess 38. Therefore, the annular recess 38 can reliably hold contaminants.

Further, the bearing 33 which is a shielded bearing is less likely to be caught by contaminants slipping through the passage 5. Therefore, the rotary connector 1 can stably function over a longer period of time.

In addition, in the inner peripheral electrode 20, the large-diameter cylinder 20*b* and the small-diameter cylinder 20*d* are continuous. In other words, even when the intermediate-diameter cylinder 20*c* is formed to have the same diameter as that of the small-diameter cylinder 20*d*, it is possible to prevent contaminants from descending due to gravity and moving vertically downward in a straight line since the bent portion is formed in the passage 5 by the annular protrusion 37.

Second Embodiment

Next, a rotary connector according to a second embodiment of the present invention will be described with reference to FIG. 4. Additionally, the same reference numerals are given to the same components as those illustrated in the first embodiment, and redundant descriptions are omitted.

Figure 4:
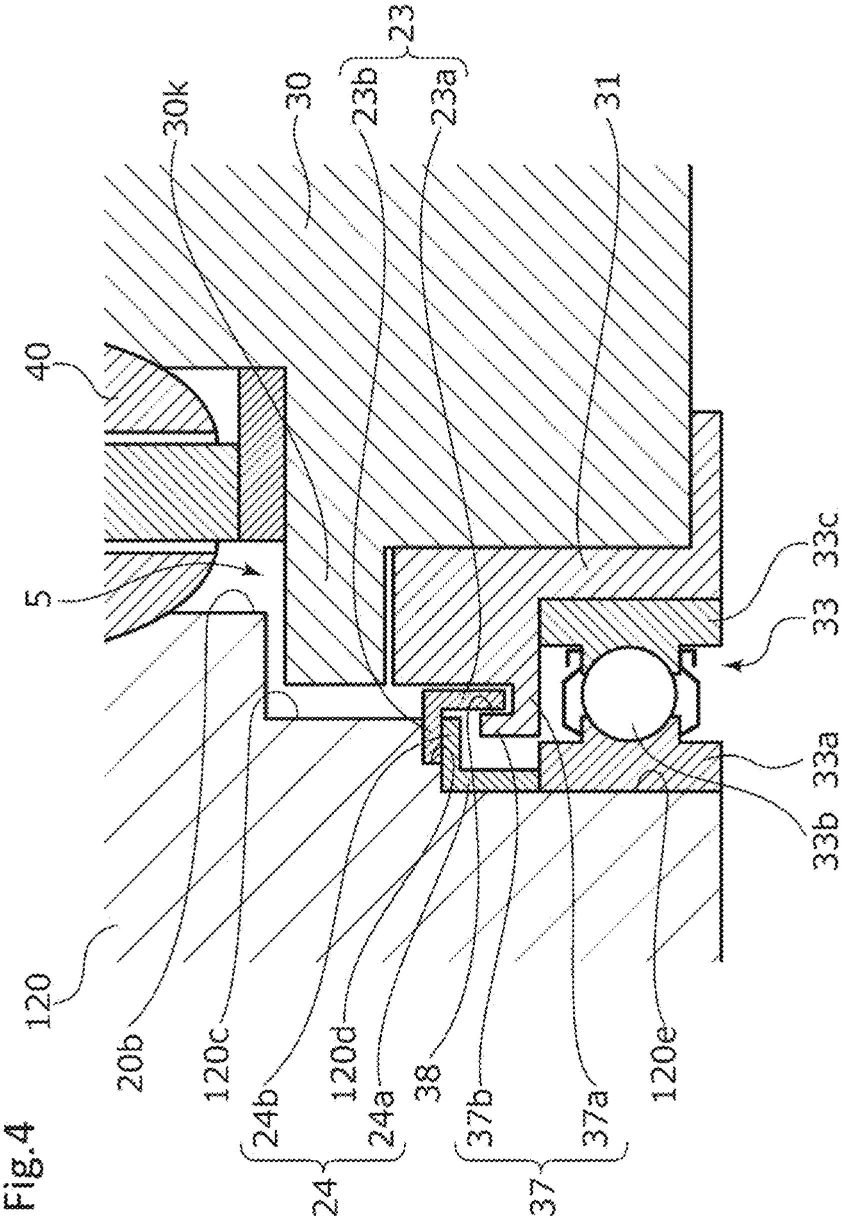
FIG. 4 is a main enlarged view of a rotary connector according to a second embodiment of the present invention.

As illustrated in FIG. 4, a protrusion member 23 extending downward at the outer radial side and a pushing member 24 extending downward at the inner radial side are fixed to an inner peripheral electrode 120.

The protrusion member 23 is formed in a flange attached cylindrical shape and includes a tubular portion 23*a* serving as a protrusion portion extending toward the annular recess 38 and an inner flange portion 23*b* serving as a protrusion and an outer radial protrusion. The tubular portion 23*a* is formed in a cylindrical shape extending in the axial direction. The inner flange portion 23*b* is formed in an annular flat plate shape substantially orthogonal to the upper end of the tubular portion 23*a* and extending radially inward.

The protrusion member 23 is externally fitted on an outer peripheral surface of a small-diameter cylinder 120*d* in the inner peripheral electrode 120. Further, in the protrusion member 23, the upper end surface of the inner flange portion 23*b* comes into contact with a lower end surface of an intermediate-diameter cylinder 120*c* in the inner peripheral electrode 120. Further, the lower end surface of the inner flange portion 23*b* is disposed substantially on the same plane as the lower end surface of the small-diameter cylinder 120*d*. That is, the inner flange portion 23*b* in the protrusion member 23 extends radially outward from the small-diameter cylinder 120*d* in the inner peripheral electrode 120 and the outer radial end portion of the inner flange portion 23*b* protrudes radially outward from the outer peripheral surface of the intermediate-diameter cylinder 120*c*. That is, the outer radial end portion of the inner flange portion 23*b* constitutes the protrusion extending radially outward from the inner peripheral electrode 120.

The pushing member 24 is formed in a flange attached cylindrical shape and includes a tubular portion 24*a* and an outer flange portion 24*b*. The tubular portion 24*a* is formed in a cylindrical shape extending in the axial direction. The outer flange portion 24*b* is formed in an annular flat plate shape substantially orthogonal to the upper end of the tubular portion 24*a* and extending radially outward.

The pushing member 24 is externally fitted on the outer peripheral surface of the lower shaft 120*e* in the inner peripheral electrode 120. Further, the upper end surface of the outer flange portion 24*b* of the pushing member 24 is in contact with the lower end surface of the small-diameter cylinder 120*d* in the inner peripheral electrode 120 and the lower end surface of the inner flange portion 23*b* in the protrusion member 23.

Further, the lower edge of the tubular portion 24*a* of the pushing member 24 comes into contact with the inner race 33*a* of the bearing 33 to restrict the position of the bearing 33.

Here, the protrusion member 23 is inserted into the annular recess 38 at the lower end portion of the tubular portion 23*a*, more specifically, from the axial center to the lower edge of the tubular portion 23*a*.

Accordingly, the protrusion member 23 is disposed at the axially upper side of the annular recess 38 like an eave. Therefore, the protrusion member 23 not only prevents contaminants from moving linearly toward the bearing 33 but also tends to guide contaminants to the annular recess 38.

More specifically, the inner peripheral surface of the tubular portion 23*a* is disposed substantially in parallel to the inner peripheral surface of the inner radial tubular portion 37*b* in the annular protrusion 37 to be separated therefrom in the radial direction. The lower end surface of the tubular portion 23*a* is disposed to be separated from the upper end surface of the bottom portion 37*a* in the annular protrusion 37. The outer peripheral surface of the tubular portion 23*a* is disposed substantially in parallel to the inner peripheral surface of the intermediate-diameter hole portion 31*c* in the lower bearing holder 31 to be separated therefrom in the radial direction. That is, a labyrinth structure is formed by the tubular portion 23*a* in the protrusion member 23 and the annular recess 38 formed in the annular protrusion 37.

Accordingly, since contaminants are dropped and trapped on the annular recess 38 formed on the annular protrusion 37 extending radially inward and the inner flange portion 23*b* of the protrusion member 23 extending radially outward at the bent portion formed in the passage 5, it is possible to restrict the movement of contaminants in the passage 5. Further, since the inner flange portion 23*b* extending radially outward and the annular protrusion 37 extending radially inward overlap each other in the vertical direction to form the plurality of bent portions so that the passage 5 extends in a zigzag shape, contaminants are less likely to reach the bearing.

Further, since a labyrinth structure is formed in such a manner that the lower end portion of the tubular portion 23*a* extending downward from the inner flange portion 23*b* enters the annular recess 38 formed in the annular protrusion 37, it is possible to more effectively prevent contaminants from moving toward the bearing 33.

Third Embodiment

Next, a rotary connector according to a third embodiment of the present invention will be described with reference to FIG. 5. Additionally, the same reference numerals are given to the same components as those illustrated in the first and second embodiments, and redundant descriptions are omitted.

Figure 5:
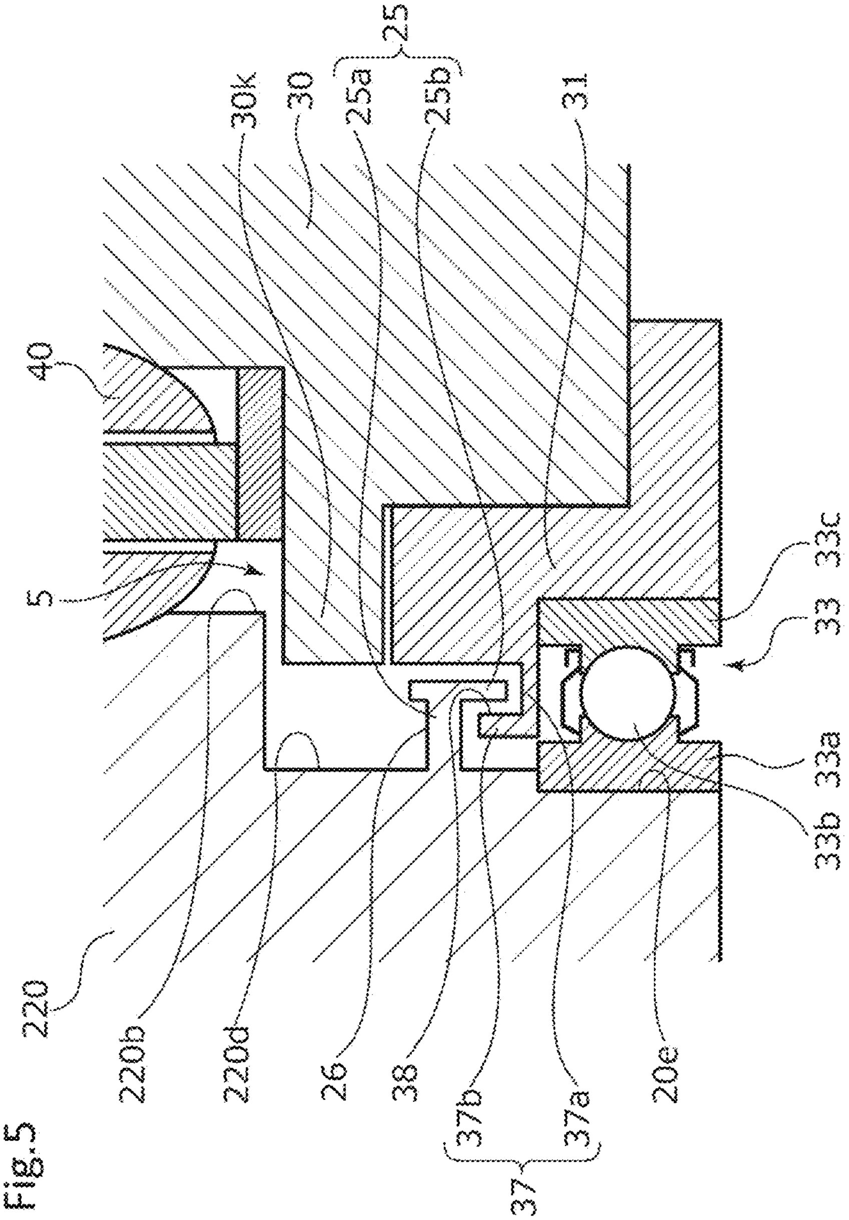
FIG. 5 is a main enlarged view of a rotary connector according to a third embodiment of the present invention.

As illustrated in FIG. 5, in an inner peripheral electrode 220, a large-diameter cylinder 220*b* and a small-diameter cylinder 220*d* are continuous. Further, the small-diameter cylinder 220*d* is provided with an annular protrusion 25 having a lateral T-shaped cross-section and protruding radially outward from the outer peripheral surface thereof.

The annular protrusion 25 includes an annular plate portion 25*a* serving as a protrusion and an outer radial protrusion and a tubular portion 25*b* serving as a protrusion portion extending toward the annular recess 38. The annular plate portion 25*a* extends radially outward to be substantially orthogonal to the outer peripheral surface of the small-diameter cylinder 220*d*. The tubular portion 25*b* extends axially upward and downward to be substantially orthogonal to the outer radial end of the annular plate portion 25*a*.

The annular protrusion 25 is disposed at the axially upper side of the annular recess 38 like an eave. The tubular portion 25*b* forms a labyrinth structure together with the annular recess 38 formed in the annular protrusion 37.

Accordingly, in this embodiment, since the annular plate portion 25*a* of the annular protrusion 25 and the annular protrusion 37 form a plurality of bent portions in the passage 5 so that the passage 5 extends in a zigzag shape, contaminants are less likely to reach the bearing 33.

Further, since a labyrinth structure is formed in such a manner that the lower end portion of the tubular portion 25*b* extending downward from the annular plate portion 25*a* enters the annular recess 38 formed in the annular protrusion 37, it is possible to more effectively prevent contaminants from moving toward the bearing 33.

Further, an annular recess 26 serving as an annular recess opening axially upward is formed above the annular protrusion 25 by the upper end portion of the tubular portion 25*b* and the outer peripheral surface of the small-diameter cylinder 220*d*. In this way, contaminants can be trapped not only by the annular recess 38 in the stationary element 3 but also the annular recess 26 in the rotary element 2.

Further, the radial length of the annular recess 26 is longer than that of the passage 5 between the annular protrusion 25 and the outer peripheral electrode 30 and contaminants are likely to flow into the annular recess 26.

Fourth Embodiment

Next, a rotary connector according to a fourth embodiment of the present invention will be described with reference to FIG. 6. Additionally, the same reference numerals are given to the same components as those illustrated in the first to third embodiments, and redundant descriptions are omitted.

Figure 6:
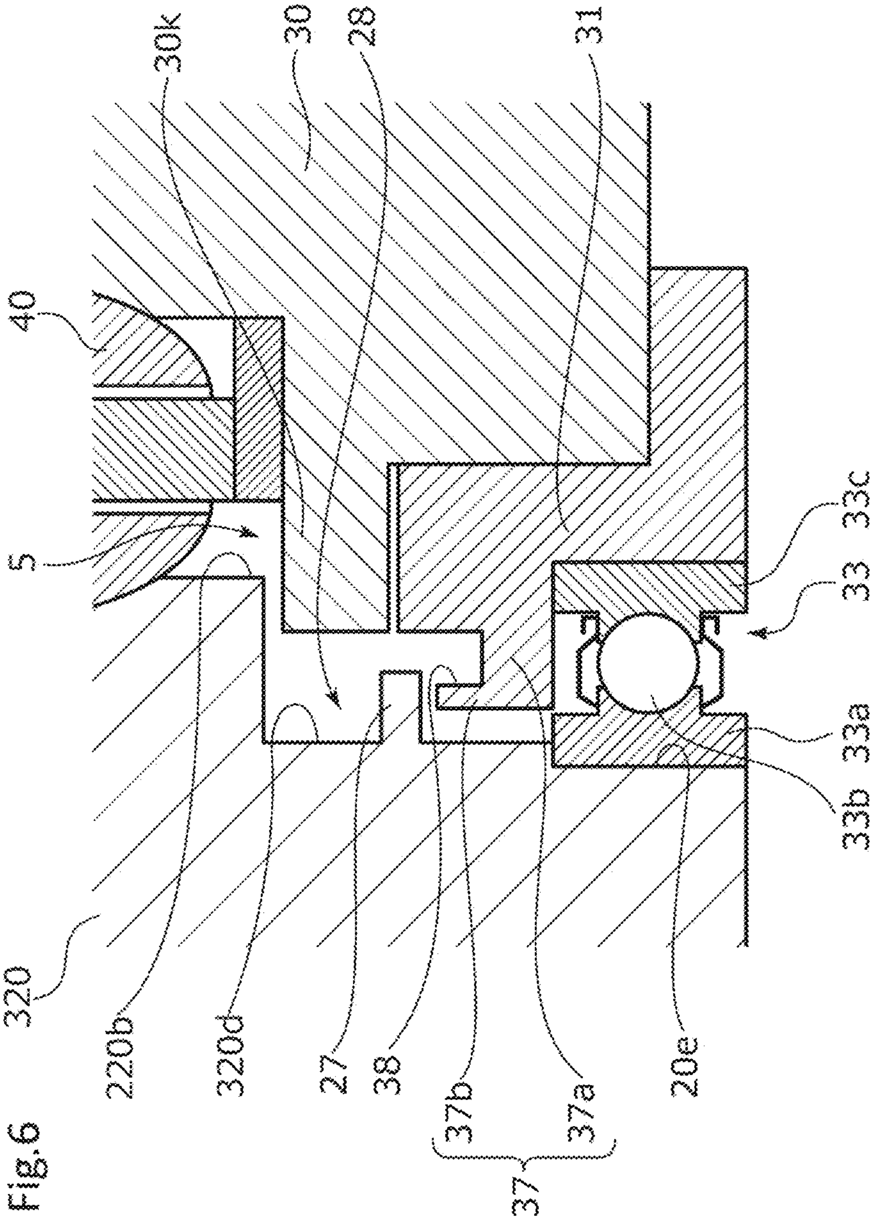
FIG. 6 is a main enlarged view of a rotary connector according to a fourth embodiment of the present invention.

As illustrated in FIG. 6, a small-diameter cylinder 320*d* of an inner peripheral electrode 320 is provided with an annular protrusion 27 serving as a protrusion and an outer radial protrusion protruding radially outward to be substantially orthogonal to the outer peripheral surface thereof. The annular protrusion 27 is disposed at the axially upper side of the annular recess 38 formed on the annular protrusion 37 like an eave.

Accordingly, in this embodiment, since a plurality of bent portions are formed in the passage 5 by the annular protrusion 27 and the annular protrusion 37 so that the passage 5 extends in a zigzag shape, contaminants are less likely to reach the bearing 33.

Further, the annular protrusion 27 defines a radial annular concave portion 28 together with the lower end surface of the large-diameter cylinder 220*b* and the outer peripheral surface of the small-diameter cylinder 320*d*. In this way, contaminants can be trapped not only by the annular recess 38 in the stationary element 3 but also the radial annular concave portion 28 in the rotary element 2, specifically, the upper end surface of the annular protrusion 27. Further, the radial length of the radial annular concave portion 28 is longer than the passage 5 between the annular protrusion 27 and the outer peripheral electrode 30 and contaminants are likely to be trapped by the upper end surface of the annular protrusion 27.

Fifth Embodiment

Next, a rotary connector according to a fifth embodiment of the present invention will be described with reference to FIG. 7. Additionally, the same reference numerals are given to the same components as those illustrated in the first to fourth embodiments, and redundant descriptions are omitted.

Figure 7:
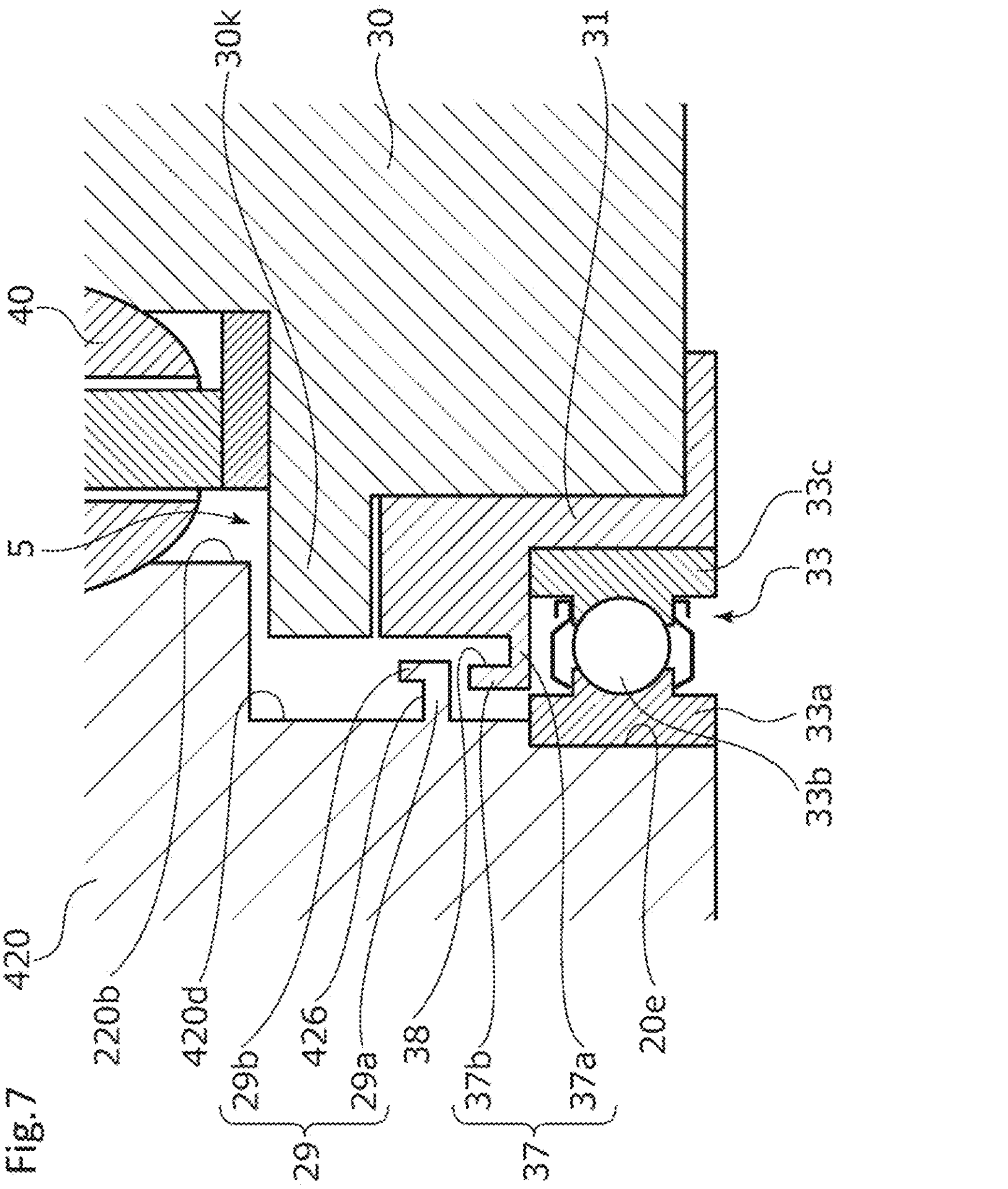
FIG. 7 is a main enlarged view of a rotary connector according to a fifth embodiment of the present invention.

As illustrated in FIG. 7, a small-diameter cylinder 420*d* in an inner peripheral electrode 420 is provided with a lateral L-shaped annular protrusion 29 serving as a protrusion and an outer radial protrusion protruding from the outer peripheral surface in the radial direction.

The annular protrusion 29 includes an annular plate portion 29*a* and a tubular portion 29*b*. The annular plate portion 29*a* extends radially outward to be substantially orthogonal to the outer peripheral surface of the small-diameter cylinder 420*d*. The tubular portion 29*b* extends axially upward to be substantially orthogonal to the outer radial end of the annular plate portion 29*a*.

Accordingly, the annular protrusion 29 is disposed at the axially upper side of the annular recess 38 like an eave. Further, the annular protrusion 29 forms an annular recess 426 together with the outer peripheral surface of the small-diameter cylinder 420*d*.

The protrusion described in the second to fifth embodiments may be separated from the inner peripheral electrode or may be integrated with the inner peripheral electrode.

Sixth Embodiment

Next, a rotary connector according to a sixth embodiment of the present invention will be described with reference to FIG. 8. Additionally, the same reference numerals are given to the same components as those illustrated in the first to fifth embodiments, and redundant descriptions are omitted.

Figure 8:
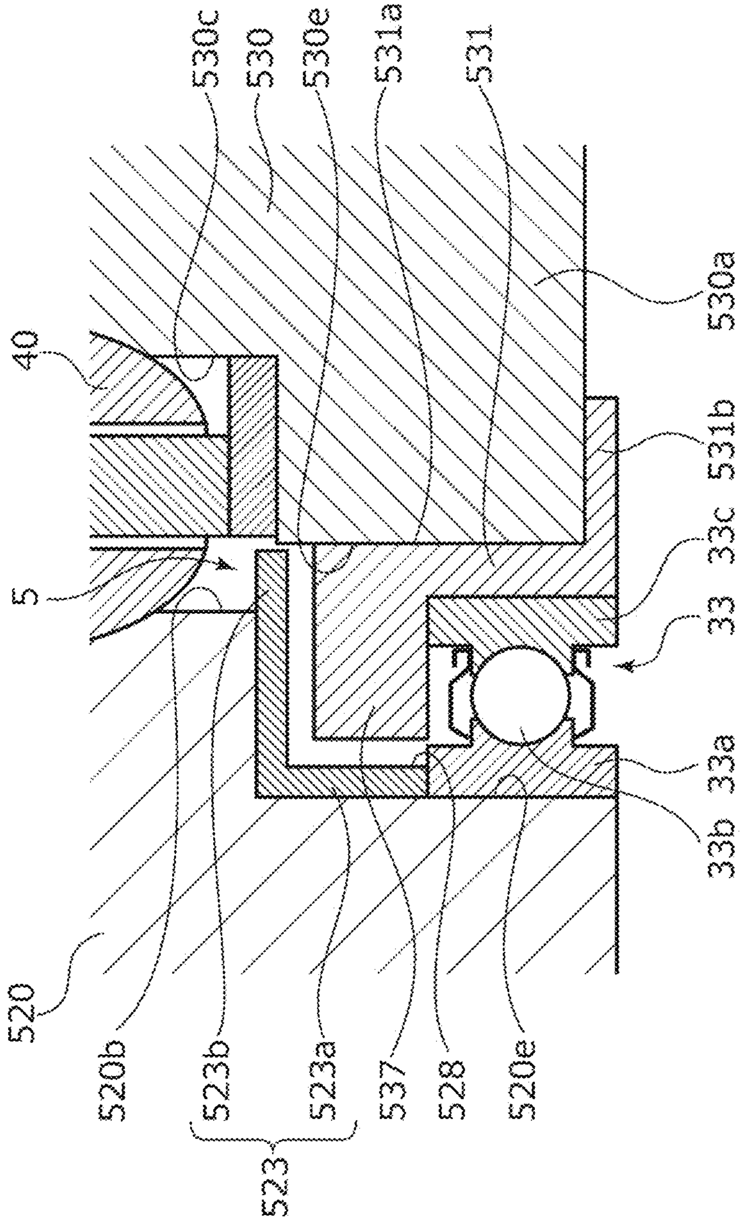
FIG. 8 is a main enlarged view of a rotary connector according to a sixth embodiment of the present invention.

As illustrated in FIG. 8, an outer peripheral electrode 530 is different from those of the first to fifth embodiments in that the inner flange portion 30*k* is not provided. That is, a large-diameter hole portion 530*c* and an intermediate-diameter hole portion 530*e* are continuous on the inner radial side of the outer peripheral electrode 530. Further, the axial dimension on the lower side of the large-diameter hole portion 530*c* in the outer peripheral electrode 530 is shorter than those of the first to fifth embodiments.

A lower bearing holder 531 is formed in a flange attached cylindrical shape. The lower bearing holder 531 includes a tubular portion 531*a*, an outer flange portion 531*b*, and an annular protrusion 537 serving as a protrusion and an inner radial protrusion.

In an inner peripheral electrode 520, a large-diameter cylinder 520*b* and a lower shaft 520*e* are continuous and the axial dimension on the lower side of the large-diameter cylinder 520*b* is shorter than those of the first to fifth embodiments. Further, a protrusion member 523 is fixed to the inner peripheral electrode 520.

The protrusion member 523 is formed in a flange attached cylindrical shape and includes a tubular portion 523*a* and an outer flange portion 523*b* serving as a protrusion and an outer radial protrusion. The tubular portion 523*a* is formed in a cylindrical shape extending in the axial direction. The outer flange portion 523*b* is formed in an annular flat plate shape substantially orthogonal to the upper end of the tubular portion 523*a* and extending radially outward.

In a state in which the protrusion member 523 is externally fitted on the outer peripheral surface of the lower shaft 520*e* in the inner peripheral electrode 520, the outer radial end portion of the outer flange portion 523*b* protrudes radially outward from the outer peripheral surface of the large-diameter cylinder 520*b*. That is, the outer radial end portion of the outer flange portion 523*b* forms a protrusion extending radially outward from the inner peripheral electrode 520.

More specifically, the outer flange portion 523*b* extends substantially in parallel to the upper end surface of the annular protrusion 537 serving as a protrusion and an inner radial protrusion in the lower bearing holder 531 to be separated therefrom in the axial direction. Further, the outer radial edge of the outer flange portion 523*b* is disposed to be separated from the inner peripheral surface of the intermediate-diameter hole portion 530*e* in the outer peripheral electrode 530 in the radial direction.

Further, the protrusion member 523 defines a radial annular concave portion 528 together with the upper end surface of the bearing 33. The annular protrusion 537 of the lower bearing holder 531 is disposed to be inserted into the radial annular concave portion 528 and the inner radial edge of the annular protrusion 537 is disposed to be separated from the outer peripheral surface of the tubular portion 523*a* in the protrusion member 523 in the radial direction. That is, the protrusion member 523 and the annular protrusion 537 of the lower bearing holder 531 form a labyrinth structure.

Accordingly, in this embodiment, since a plurality of bent portions are formed in the passage 5 by the annular protrusion 537 and the outer flange portion 523*b* in the protrusion member 523 so that the passage 5 extends in a zigzag shape, contaminants are less likely to reach the bearing 33.

Further, since the annular protrusion 537 is disposed above the bearing 33 like an eave, contaminants are prevented from moving linearly toward the bearing 33.

Further, since a plurality of bent portions can be formed with a simple structure by the outer flange portion 523*b* in the protrusion member 523 extending radially outward from the inner peripheral electrode 520 and the annular protrusion 537 extending radially inward from the lower bearing holder 531, the bent portion can be formed even when the passage 5 communicating from the roller current collector 40 to the lower bearing 33 is small in the axial direction.

Further, since the protrusion member 523 is separated from the inner peripheral electrode 520, the protrusion member 523 can be formed of a material different from that of the inner peripheral electrode. For example, contaminants can be easily trapped by the outer radial end portion of the outer flange portion 523*b* and the movement of contaminants toward the bearing 33 can be prevented more effectively by selecting a material that easily attracts contaminants.

In addition, the protrusion described in this embodiment is not limited to the protrusion member separated from the inner peripheral electrode and may be integrally formed with the inner peripheral electrode to facilitate manufacturing.

Further, contaminants may be trapped by an annular recess by forming the annular recess opening axially upward on the upper end surface of the outer flange portion 523*b* or the upper end surface of the lower bearing holder 531.

Although the first to sixth embodiments of the present invention have been described with reference to the drawings, the specific configurations are not limited to those of the first to sixth embodiments, and any modifications and additions that do not depart from the scope of the present invention are included in the present invention.

For example, in the above-described first to sixth embodiments, although it has been described such that the inner peripheral electrode and the outer peripheral electrode are cased by the housing and the cover, the present invention is not limited thereto and the inner peripheral electrode and the outer peripheral electrode may be exposed.

Further, in the above-described first to sixth embodiments, although it has been described such that the roller current collector has a barrel shape, the present invention is not limited thereto. For example, the roller current collector may have a cylindrical shape or a shape in which the diameter is reduced from both axial ends toward the axial center and the shape may be changed as appropriate. Accordingly, the shape of the annular groove in which the roller current collector is disposed may be changed as appropriate. Further, the annular groove may not have a shape along the roller current collector.

Further, in the above-described first to sixth embodiments, although it has been described such that the pin of the holder is formed of a highly conductive material, the present invention is not limited thereto and the pin may be formed of a highly insulating material.

Further, in the above-described first to sixth embodiments, although it has been described such that the pin of the holder is elastically deformable, the present invention is not limited thereto and the pin may be a rigid body. With such a configuration, the contact area between the pin and the roller current collector can be reduced by thinning the pin.

Further, in the above-described first to sixth embodiments, although it has been described such that the recess is formed in an annular shape, the present invention is not limited thereto and one or more recesses which are not continuous in an annular shape may be formed.

Further, in the above-described first to sixth embodiments, although it has been described such that only one annular concave portion is formed in the stationary element, the present invention is not limited thereto and a plurality of recesses may be formed at intervals in the radial direction. The same applies to the rotary element.

Further, in the above-described first to sixth embodiments, although it has been described such that the annular protrusion and the annular concave portion are formed in the lower bearing holder in the stationary element, these may be formed in another element, for example, the outer peripheral electrode if it is the stationary element.

Further, in the above-described first to sixth embodiments, although it has been described such that each of the inner peripheral electrode, the outer peripheral electrode, and the roller current collector is plated, the present invention is not limited thereto and these may not be plated if they are formed of a highly conductive material.

Further, in the above-described first to sixth embodiments, although it has been described such that the bearing has the lip seals arranged on the upper and lower sides, the present invention is not limited thereto. For example, at least the upper lip seal may be provided and the lower lip seal may be omitted.

REFERENCE SIGNS LIST

1 Rotary connector
2 Rotary element
3 Stationary element
4 Current collecting element
5 Passage
20 Inner peripheral electrode
23 Protrusion member
23*a* Tubular portion (protrusion portion)
23*b* Inner flange portion (protrusion, outer radial protrusion)
24 Pushing member
25 Annular protrusion
25*a* Annular plate portion (protrusion, outer radial protrusion)
25*b* Tubular portion (protrusion portion)
26 Annular recess (recess)
27 Annular protrusion (protrusion, outer radial protrusion)
28 Radial annular concave portion
29 Annular protrusion (protrusion, outer radial protrusion)
30 Outer peripheral electrode
30*k* Inner flange portion (protrusion, inner radial protrusion)
31 Lower bearing holder
33 Bearing (shielded bearing)
37 Annular protrusion (protrusion, inner radial protrusion)
38 Annular recess (recess)
40 Roller current collector
50 Upper axial portion (bent portion)
51 Upper radial portion (bent portion)
52 Intermediate axial portion (bent portion)
53 Lower radial portion (bent portion)
54 Lower axial portion (bent portion)
120 Inner peripheral electrode
220 Inner peripheral electrode
220*b* Large-diameter cylinder
220*d* Small-diameter cylinder
320 Inner peripheral electrode
420 Inner peripheral electrode
426 Annular recess (recess)
520 Inner peripheral electrode
523 Protrusion member
523*b* Outer flange portion (protrusion, outer radial protrusion)
528 Radial annular concave portion
537 Annular protrusion (protrusion, inner radial protrusion)

The invention claimed is:

1. A rotary connector, comprising:
an outer peripheral electrode;
an inner peripheral electrode which is inserted through the outer peripheral electrode and is disposed to be rotatable;
a plurality of roller current collectors which are arranged to make a planetary motion between the outer peripheral electrode and the inner peripheral electrode;
a bearing that axially supports the inner peripheral electrode to be rotatable; and
a bearing holder that holds the bearing,
wherein a passage extending from a contact portion between the inner peripheral electrode and the roller current collector to the bearing is defined by a wall surface provided with an annular protrusion, and
the annular protrusion has a radial protrusion portion which is radially protruded from the wall surface to cover, in an axial direction, part of a space between an outer race and an inner race of the bearing, and an axially protruded portion which is axially protruded from the radial protrusion portion toward an opposite side of the bearing.

2. The rotary connector according to claim 1,
wherein the rotary connector is placed vertically and the annular protrusion is provided at a vertically lower side of the roller current collector.

3. The rotary connector according to claim 2,
wherein the bearing is a shielded bearing in which a shield element is provided at least vertically upward.

4. The rotary connector according to claim 1,
wherein the annular protrusion further has another radial protrusion portion which is protruded in a radial direction opposed to the protrusion direction of the radial protrusion portion, and
wherein the radial protrusion portion and the another radial protrusion portion overlap each other in a vertical direction.

5. The rotary connector according to claim 1,
wherein the a recess which is formed by the radial protrusion portion and the axial protrusion portion to open vertically upward is provided.

6. The rotary connector according to claim 5,
wherein the recess has an annular shape.

7. The rotary connector according to claim 6,
wherein the recess is formed in the bearing holder.

8. The rotary connector according to claim 7,
wherein the another radial protrusion portion is provided with another axial protrusion portion which extends toward the recess.

9. The rotary connector according to claim 8, wherein the another axial protrusion portion partially enters the recess.

10. The rotary connector according to claim 4, wherein the bent portion includes a recess which opens vertically upward.

11. The rotary connector according to claim 10, wherein the recess has an annular shape.

12. The rotary connector according to claim 11, wherein the recess is formed in the bearing holder.

13. The rotary connector according to claim 12, further comprising:

a protrusion portion which extends toward the recess.

14. The rotary connector according to claim 13, wherein the protrusion portion partially enters the recess.

15. A rotary connector, comprising:

an outer peripheral electrode;

an inner peripheral electrode which is inserted through the outer peripheral electrode and is disposed to be rotatable;

a plurality of roller current collectors which are arranged to make a planetary motion between the outer peripheral electrode and the inner peripheral electrode;

a bearing that axially supports the inner peripheral electrode to be rotatable; and a bearing holder that holds the bearing, wherein a) the rotary connector further comprises a protrusion member which is made of a different material from the inner peripheral electrode and which is fixed to the inner peripheral electrode, and the protrusion member has a protrusion portion which is protruded to a passage extending from contact portions between the inner peripheral electrode and the roller current collectors to the bearing, or b) the rotary connector further comprises a protrusion member which is made of a different material from the outer peripheral electrode and which is fixed to the outer peripheral electrode, and the protrusion member has a protrusion portion which is protruded to a passage extending from contact portions between the outer peripheral electrode and the roller current collectors to the bearing.

16. The rotary connector according to claim 15, wherein the bearing holder has a protrusion which is protruded to the passage, the protrusion portion of the protrusion member and the protrusion portion of the bearing holder overlap with each other in the axial direction, thereby forming a labyrinth structure in the passage.

17. The rotary connector according to claim 16, wherein the rotary connector is placed vertically and the labyrinth structure is provided at a vertically lower side of the roller current collector.

18. The rotary connector according to claim 15, wherein the bearing is a shielded bearing in which a shield element is provided at least vertically upward.

* * * * *